US007558041B2

(12) United States Patent
Lagnoux

(10) Patent No.: US 7,558,041 B2
(45) Date of Patent: Jul. 7, 2009

(54) OVERVOLTAGE PROTECTION DEVICE WITH DUAL CONTACT SURFACE THERMAL DISCONNECTOR

(75) Inventor: Alain René Robert Lagnoux, Rabastens de Bigorre (FR)

(73) Assignee: ABB France, Rueil-Malmaison Cedex (FR)

( * ) Notice: Subject to any disclaimer, the term of this patent is extended or adjusted under 35 U.S.C. 154(b) by 349 days.

(21) Appl. No.: 11/678,451

(22) Filed: Feb. 23, 2007

(65) Prior Publication Data

US 2008/0019073 A1 Jan. 24, 2008

(51) Int. Cl.
*H02H 1/00* (2006.01)

(52) U.S. Cl. ...................................... 361/124; 361/117

(58) Field of Classification Search ................. 361/117, 361/120, 124, 125, 126

See application file for complete search history.

(56) References Cited

U.S. PATENT DOCUMENTS 2,966,649 A 12/1960 Haynman
4,034,326 A 7/1977 Hill et al.
7,002,783 B2 * 2/2006 Lee .......................... 361/91.3
2006/0067021 A1 * 3/2006 Li et al. ........................ 361/30

FOREIGN PATENT DOCUMENTS

DE 1515019 6/1969
DE 1515624 4/1970
EP 1077452 2/2001
GB 1123324 8/1968

* cited by examiner

*Primary Examiner*—Danny Nguyen
(74) *Attorney, Agent, or Firm*—Jason A. Bernstein; Barnes & Thornburg LLP

(57) ABSTRACT

A device (1) for protecting an electrical installation (2) from overvoltages, including at least one protection component (3), and disconnection element (4) capable of ensuring the electrical disconnection of the protection component from the installation by moving from a closed configuration to an open configuration, wherein the device (1) has at least one first fuse element (7) and one second fuse element (8) capable of holding the disconnection element (4) in the closed configuration, and wherein the disconnection element (4) includes at least one first contact surface (4A) and one second contact surface (4B) substantially intersecting with one another and to which the first and second fuse elements respectively adhere when the disconnection element (4) are in the closed configuration, to distribute the stresses exerted on the fuse elements and reinforce the mechanical strength of the disconnection element.

14 Claims, 2 Drawing Sheets

OVERVOLTAGE PROTECTION DEVICE WITH DUAL CONTACT SURFACE THERMAL DISCONNECTOR

PRIORITY CLAIM

This patent application claims priority to French Patent application No. 06 01677, filed Feb. 24, 2006, the disclosure of which is incorporated herein by reference in its entirety.

FIELD OF THE INVENTION

The present invention relates to devices for protecting electrical installations and equipment from electrical overvoltages, in particular transient overvoltages, especially caused by lightning.

The present invention relates more specifically to devices for protecting an electrical installation from overvoltages.

The present invention also relates to a method for producing a device for protecting an electrical installation from overvoltages.

BACKGROUND OF THE INVENTION

The use of protection devices capable of protecting electrical or electronic apparatuses from overvoltages, which may result, for example, from lightning, is known.

These protection devices generally comprise one or more overvoltage protection components, such as, for example, a varistor or a spark gap. When the protection components are exposed to voltages above a predetermined threshold, the protection components are capable of conducting the default current to the ground while limiting the overvoltage to a value compatible with the capacity of the installation and equipment connected to the protection device.

In the event of a failure, protection components may be subject to significant heating that can cause serious damage to the installation and present risks to the user, for example, by starting a fire. This is why overvoltage protection devices are generally provided with thermal disconnection means. These thermal disconnection means are intended to isolate the protection component from the electrical installation to be protected in the case of excessive heating of the component to suppress the electrical power supply causing the heating and prevent the appearance or limit the harmful consequences of an excessive increase in temperature.

To make the thermal disconnection means sensitive to the increase in temperature of the protection component, it is known to use a fuse element of which the state is capable of being modified by the heat released by the protection component. In particular, it is known to use a solder fuse to produce the connection between one of the power supply terminals of the protection component and a mobile conductor element, such as a slider or a disconnection leaf, which is generally subjected to mechanical stress tending to separate it from the power supply terminal. Thus, when excessive heating of the protection component causes the solder to melt, the mobile conductive element separates from the power supply terminal of the protection component, thus isolating the power supply terminal from the installation to be protected.

To prevent dangerous heating of the component, the disconnection should occur before the temperature reaches a critical threshold. To this end, the fuse elements are generally produced using specific metal alloys with a relatively low melting point. Normally, the alloys used for this purpose contain lead and often other toxic materials such as cadmium.

However, health regulations will soon prohibit the use of certain toxic materials, in particular lead, as a material constituting electrical and electronic products.

It may be necessary to stop using lead alloys previously used for producing the fuse elements of thermal disconnection means, and instead use lead-free alloys with a melting temperature that is at least as low.

While such alloys are known, such as, for example, certain tin-bismuth alloys, it is impossible to replace fuse elements in the same state in the existing overvoltage protection devices because the known lead-free alloys do not have the same mechanical properties, and particularly do not have the same stress resistance as the lead alloys.

In particular, this lower mechanical strength exposes the weld joint to premature rupture capable of occurring under the effect of the electrodynamic stresses exerted on the conductive elements of the protection device when traversed by a discharge current corresponding to the limitation of an overvoltage in the context of its normal operation. In other words, the use of a lead-free solder fuse is capable of reducing the discharge power of the protection device, i.e., damaging its performance by decreasing the maximum intensity of the default current that the device can conduct repeatedly without undergoing damage.

Two major difficulties are encountered in the replacement of lead fuse elements with lead-free fuse elements. The first major difficulty is maintaining a low enough melting point to ensure the safety of operation, i.e., a fast enough activation of the thermal disconnection means; and the second major difficulty is to have adequate mechanical strength in the connection produced by the fuse element, in particular so as not to disturb the normal operation of the device by an inappropriate disconnection during the conduction of a discharge current.

SUMMARY OF THE DISCLOSURE

The features of the present invention address the various disadvantages listed above and provide a device for protecting an electrical installation from overvoltages, with thermal disconnection means having improved mechanical strength.

Another feature of the present invention is to provide an especially environmentally friendly overvoltage protection device.

Another feature of the present invention is to provide an overvoltage protection device with a particularly simple, inexpensive and reliable design.

Finally, another feature of the present invention is to provide a method for producing an overvoltage protection device making it possible to improve the mechanical strength of the disconnection means of the device.

The features of the present invention are achieved by a device for protecting an electrical installation from overvoltages, including at least one protection component intended to be connected to the electrical installation, as well as disconnection means capable of ensuring the electrical disconnection of the protection component from the installation, the disconnection means being capable of being moved from a closed configuration in which the protection component is connected to the electrical installation to an open configuration in which the protection component is disconnected from the electrical installation, wherein the device comprises at least one first fuse element and one second fuse element capable of holding the disconnection means in the closed configuration, and wherein the disconnection means comprise at least one first contact surface and one second contact surface substantially intersecting with one another and to which the first and second fuse elements respectively adhere when the disconnection means are in the closed configuration, to distribute the stresses exerted on the fuse elements and reinforce the mechanical strength of the disconnection means.

The features of the present invention are also achieved by means of a method for producing a device for protecting an electrical installation from overvoltages including at least one protection component intended to be connected to an electrical installation, as well as disconnection means capable of ensuring the electrical disconnection of the protection component from the installation, the disconnection means being capable of being moved from a closed configuration in which the protection component is connected to the electrical installation to an open configuration in which the protection component is disconnected from the electrical installation, wherein the method comprises a step of producing the disconnection means in which the disconnection means are given at least one first contact surface and one second contact surface substantially intersecting with one another, as well as an assembly step in which at least one first fuse element and one second fuse element are mounted in the device so that the fuse elements can hold the disconnection means in the closed configuration, and so that the first and second fuse elements respectively adhere to the first and second contact surfaces when the disconnection means are in the closed configuration, to distribute the stresses exerted on the fuse elements and reinforce the mechanical strength of the disconnection means.

BRIEF DESCRIPTION OF THE DRAWINGS

Other features and advantages of the present invention will appear in greater detail on reading the following description, and with reference to the drawings provided purely for illustrative and non-limiting purposes.

DETAILED DESCRIPTION OF THE EMBODIMENTS

Figure 1:
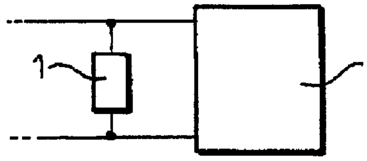
FIG. 1 is a diagrammatic view of a protection device according to one exemplary embodiment of the present invention connected to an electrical installation to be protected.

The device 1 for protecting an electrical installation 2 from overvoltages, according to the present invention, is intended to be shunt-connected (or connected "in parallel") to the electrical installation 2 in order to protect the electrical installation from overvoltages, as shown in FIG. 1.

For purposes of the present disclosure, the term "electrical installation" refers to any type of electrically powered apparatus or network capable of undergoing voltage disturbances, in particular transient overvoltages caused by lightning.

The protection device 1 can advantageously constitute a lightning arrestor.

The overvoltage protection device 1 according to the present invention is advantageously intended to be placed between a phase of the installation to be protected 2 and the ground. It is also possible to envisage, without going beyond the scope of the present invention, that the device 1, instead of being shunt-connected between a phase and the ground, is connected between a neutral conductor and the ground, between the phase and the neutral conductor, or between two phases to form a differential protection.

The protection device 1 according to the present invention includes at least one protection component 3 intended to be connected to the electrical installation 2 and to protect the electrical installation from overvoltages, in particular transient overvoltages. In the following description, each overvoltage protection component 3 is considered to be formed by a varistor, with the understanding that the use of a varistor is indicated only by way of example, and in no way constitutes a restriction of the present invention.

In other words, the protection device 1 comprises one or more overvoltage protection components that, when exposed to voltages above a predetermined threshold value, are capable of conducting the default current to the ground while limiting the overvoltage to a value compatible with the capacity of the installation.

The varistor 3 is preferably in the form of a substantially flat parallelepiped rectangle equipped with two power supply terminals 12, 14.

The protection device 1 also includes disconnection means 4 capable of ensuring the electrical disconnection of the protection component 3 from the electrical installation 2, in particular in the event of a failure of the protection component 3. The disconnection means 4 are preferably capable of being moved from a closed configuration in which the protection component 3 is connected to the electrical installation, as shown, for example, in FIG. 2, in an open configuration in which the protection component 3 is disconnected from the electrical installation, as shown, for example, in FIG. 3.

Preferably, at least one portion of the disconnection means 4 is mobile, preferably in rotation, between a closed position in which the disconnection means 4 ensures the electrical connection of the varistor 3 to the electrical installation 2, and an open position in which the disconnection means 4 separate the varistor 3 from the installation 2. Thus, the closed and open positions respectively correspond to the closed and open positions.

Preferably, the disconnection means 4 are mounted prestressed when in the closed position, i.e., the mobile portion is mounted under stress in the closed position and subjected to an elastic return force F, which tends to propel the mobile portion toward its open position. This elastic return force can be external, for example, created by the compression of a spring that is mechanically associated with the disconnection means 4, or internal, if the disconnection means 4 are elastic. More preferably, the disconnection means 4 are formed by an electrically conductive spring leaf 5, for example, metallic, of which a free end is prestressed, for example, by bending, when in the closed position. Below, the disconnection means 4 will be considered to be a spring leaf 5, also called "disconnection leaf", without constituting a restriction of the present invention.

According to a preferred exemplary embodiment, the device 1 also includes blocking means 6 capable of holding the disconnection leaf 5 in the closed position and, under certain conditions, of releasing the disconnection leaf 5 so as to allow the disconnection leaf 5 to move into the open position.

According to the present invention, the blocking means 6 include at least one first fuse element 7 and one second fuse element 8 each exerting a basic holding force, the combination of which makes it possible to obtain an adequate resulting holding force to keep the disconnection means 4 in the closed configuration.

The first and second fuse elements 7, 8 are, in particular, sensitive to the heat capable of being released by the protection component 3. In particular, the fuse elements 7, 8 are arranged so that the rupture occurs under the effect of the heat released by the protection component 3 and, consequently, releases the sprint leaf 5. The disconnection means 4 can advantageously constitute thermal disconnection means.

For purposes of the present disclosure, the term "rupture" means any loss in cohesion of the fuse element, which can consist, for example, of a reduction in the adherence, in ductile tearing under stress due, in particular, to softening, a fragile rupture due to a shock, or partial or total melting.

More specifically, to perform the holding function, the first and second fuse elements 7, 8 will preferably produce, when the disconnection means 4 are in the closed configuration, a fitting-type mechanical connection between an element that is stationary with respect to the protection component 3 and the disconnection leaf 5.

The protection device according to the present invention comprises at least one first fuse element 7 and one second fuse element 8 capable of holding the disconnection means 4 in the closed configuration.

The closed configuration corresponds to a preferably unstable state of the protection device 1, in which the protection component 3 is electrically connected to the electrical installation 2, and is capable of being supplied and traversed by an electrical current, in particular, a discharge current. The open configuration corresponds to a preferably stable state of the device 1, in which the disconnection means 4 are in a return position which ensures the electrical separation between the protection component 3 and the installation 2, i.e., the isolation of the protection component.

According to an alternative exemplary embodiment, the open configuration can correspond to a state of isolation of the protection component 3 and to a state of isolation of the device 1 with respect to the electrical installation 2. In particular, the open configuration will preferably prevent the short-circuiting of the electrical installation 2.

While it can be envisaged, without going beyond the context of the present invention, that one and/or the other of the fuse elements is connected to an auxiliary mechanism indirectly blocking the disconnection leaf 5 when in the closed position, the first and second fuse elements will preferably be in direct contact with the disconnection means 4.

According to one feature of the present invention, the disconnection means 4 preferably comprise at least one first contact surface 4A and one second contact surface 4B, substantially intersecting with one another and to which the first fuse element 7 and the second fuse element 8 respectively adhere when the disconnection means 4 are in the closed configuration.

Thus, it is possible to distribute the stresses exerted by the disconnection means 4 over the first and second fuse elements 7, 8 and reinforce the mechanical strength of the disconnection means 4, in particular with respect to the electrodynamic stresses that appear during normal conduction of lightning currents through the device 1.

According to one exemplary embodiment, the contact surfaces 4A and 4B will be substantially perpendicular. The first fuse element 7 and/or the second fuse element 8 preferably include a solder. Even more preferably, the first and second fuse elements are each formed by a solder.

To produce the solders, it is suitable to use filler materials with a melting temperature below or equal to the critical temperature considered to be the danger threshold in the event of heating of the varistor 3.

According to one exemplary embodiment, the fuse elements 7, 8 are produced with a tin-bismuth alloy, in particular, an alloy containing 43% tin and 57% bismuth. The melting temperature of such an alloy is on the order of 138° C. while that of an alloy containing 50% tin, 18% cadmium and 32% lead approaches 145° C.

The fuse elements 7, 8 comprise, as the filler metal used to produce the solder(s), a metal or an alloy containing less than 0.1% by weight lead, considerably limiting the use of harmful substances.

In a particularly advantageous manner, this use of an alloy of which the intrinsic mechanical strength is lower than that of certain lead alloys of the prior art is made possible by the specific configuration, according to this present invention, of fuse elements.

For purposes of the present disclosure, the term "contact surfaces" means surface elements intended to be functionally jointed to the fuse elements. In particular, when the corresponding fuse element is formed by a solder, the contact surface will correspond to the area intended to be wetted by the filler metal to ensure adherence. Preferably, when the disconnection means 4 are in the closed configuration, the first contact surface 4A will extend substantially orthogonally to the direction corresponding to the thickness of the first fuse element 7. Similarly, the second contact surface 4B will then preferably extend substantially orthogonally to the direction corresponding to the thickness of the second fuse element 8. In other words, the contact surfaces will preferably correspond to the main directions of extension of the fuse elements respectively associated with them.

For purposes of the present disclosure, the term "substantially intersecting" refers to the fact that the contact surfaces 4A, 4B or at least their extensions in space, connect at an intersecting line, which can be straight or anything else. In addition, depending upon whether the surfaces are contiguous or separate, for example, stacked, the intersecting line may or may not be realised.

More specifically, the first contact surface (4A) preferably extends along a first mean extension plane ($P_1$), when the disconnection means 4 are in the closed configuration.

Similarly, the second contact surface (4B) preferably extends along a second mean extension plane ($P_2$), when the disconnection means 4 are in the closed configuration.

For purposes of the present disclosure, the term "mean extension plane" means that each contact surface extends essentially in two main directions in space and that it is possible to define two mean intersecting lines, corresponding, for example, to a line of linear regression of the points constituting the respective profiles of the surface according to each of the two main directions, the extension plane being the surface created by the two mean lines.

In addition, the mean extension planes ($P_1$) and ($P_2$) constitute stationary reference planes associated with the closed configuration, and to which reference is made in order to define the shape and the movements of the elements constituting the device.

Of course, the first contact surface 4A and/or the second contact surface 4B can absolutely have substantially planar, dished, undulated, irregular profiles or a smooth or striated appearance without going beyond the scope of the present invention.

Preferably, the first contact surface 4A or the second contact surface 4B is substantially planar, and in an especially preferred manner, the first and second contact surfaces 4A, 4B are both substantially planar.

According to a feature of the present invention, the disconnection means 4 are preferably capable, when changing from the closed configuration to the open configuration, of moving substantially parallel to the first mean extension plane ($P_1$). In other words, the disconnection leaf 5 will have a tendency to glide in a translational manner along the first mean extension plane ($P_1$) when the disconnection leaf 5 moves from the closed position to the open position.

Thus, the return stress F will preferably have a tendency to urge the first fuse element 7 under shear force, in particular, to the adherence interface between the first fuse element and the first contact surface 4A.

According to another important feature of the present invention, the disconnection means 4 are preferably capable, when going from the closed configuration to the open configuration, to be substantially frontally separated from the second mean extension plane ($P_2$).

Thus, the return force F will preferably tend to urge the second fuse element 8 by a pulling or tearing force, in particular, to the adherence interface between the first fuse element and the second contact surface 4B.

Geometrically, this combination of movements and localised effects of shear force and tearing can be obtained by orienting, by construction, the first mean extension plane ($P_1$) and the second mean extension plane ($P_2$) so that the mean extension planes form an angle between 70° and 110°. Preferably, as shown in FIGS. 2, 4 and 6, the first and second mean extension planes will be substantially orthogonal.

Figure 2:
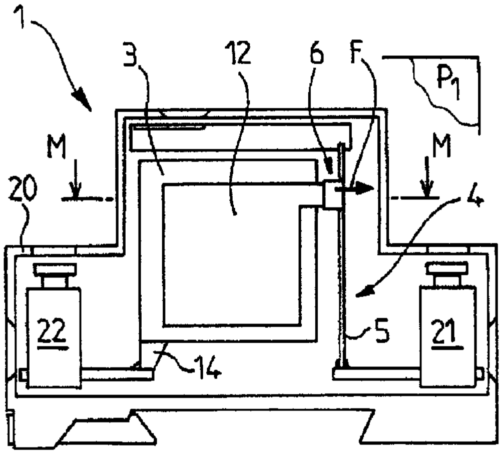
FIG. 2 is a front cross-section view of a protection device according to the present invention in its closed configuration.
Figure 4:
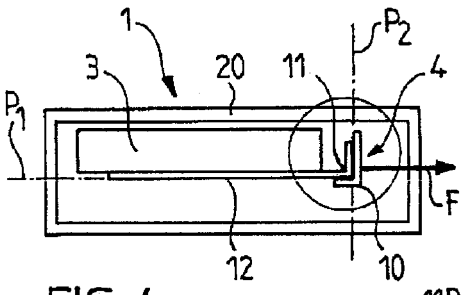
FIG. 4 is a partial top cross-section view along line M-M of the protection device of FIG. 2.
Figure 5:
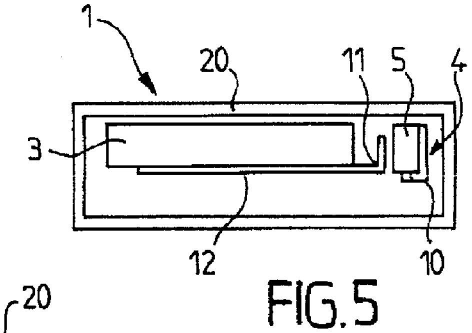
FIG. 5 is a partial top cross-section view of the protection device of FIG. 3, the cross-section plane being the same as that of FIG. 4.
Figure 6:
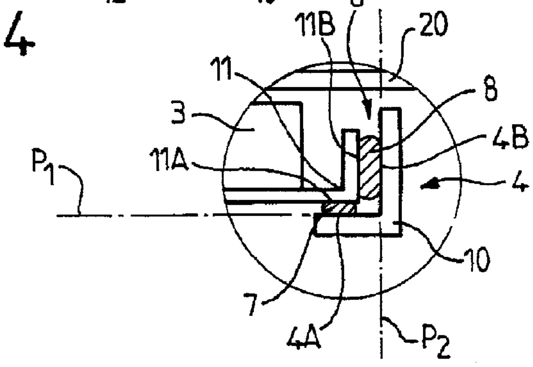
FIG. 6 is an enlarged detail view of the portion of FIG. 4 defined by a circle.

In addition, as shown in FIGS. 2, 4 and 6, the first mean extension plane ($P_1$) will preferably be substantially parallel to one of the varistor 3 surfaces, while the second mean extension plane ($P_2$) will preferably be substantially normal to the tangent at the starting point of the trajectory followed by the disconnection leaf 5 when going from the closed position to the open position.

Advantageously, the arrangement of contact surfaces 4A, 4B according to the present invention makes it possible to use the three spatial dimensions in order to increase the density of the effective surface in a given volume.

For purposes of the present disclosure, the term "effective surface" means a surface effectively contributing to the holding of the disconnection means 4 when the disconnection means 4 are in the closed configuration. Thus, the first contact surfaces 4A, 4B non-exclusively constitute effective surfaces. According to a preferred exemplary embodiment, an effective surface will correspond to an area wetted by a filler metal, which has an influence on the maximum action-effect (maximum load) allowed by the connection produced by soldering.

In addition, the arrangement of contact surfaces according to the present invention makes it possible to diversify the type of action-effects to which the fuse elements are subjected, and, in particular, to combine shear force and tearing to best take advantage of the mechanical strength capacities of the fuse elements.

More specifically, it is advantageously possible to attempt to choose a respective arrangement of fuse elements and associated contact surfaces in which the mechanical action-effect of at least one of the fuse elements, which results from the conduction of lightning currents (or even, to a lesser extent, to the spring force F), primarily involves the form (pure shear force, for example) with respect to which the fuse element is most resistant, and/or an arrangement in which the resulting stress can be minimised by an over-sizing of the surface (section) to which the action-effect is applied.

The aforementioned constructive arrangements make it possible to reinforce the mechanical strength of the blocking means 6 while using up less space.

It is particularly remarkable that this reinforcement of the mechanical strength of the blocking means 6 is also capable of enabling the device 1 to withstand violent electrodynamic effects, i.e., in particular, to resist the conduction of currents of particularly high intensity.

According to an alternative exemplary embodiment, the disconnection means 4 comprise a first connection element 10 having two branches, the first and second contact surfaces extending respectively over one and the other of the two branches. The branches are preferably arranged in an L-shape, for example, to form an angle.

In a preferred manner, the first connection element 10 is made in a single piece with the disconnection leaf 5, which can, in particular, be equipped to this end with one or more bent lugs, in particular, projecting at a right angle from the main extension plane of the leaf 5.

The device 1 according to the present invention also preferably comprises a second connection element 11 that is stationary with respect to the protection component 3 and has a shape substantially conjugated to the first connection element 10.

In a particularly advantageous manner, the second connection element 11 can be attached to, or preferably even made in a single piece with, one of the power supply terminals 12, 14 of the varistor 3.

According to a preferred exemplary embodiment, when the disconnection means 4 are in the closed configuration, the first and second fuse elements 7, 8 can be sandwiched between the first connection element 10 and the second connection element 11. As shown in FIGS. 2, 4 and 6, it is possible to produce a direct mechanical and electrical connection between the disconnection leaf 5 and the first power supply terminal 12 of the varistor 3, by overlapping the contact surfaces 4A, 4B and the corresponding effective surfaces of the stationary elements formed by the external surfaces 11A, 11B of the branches of the second connection element 11.

The use of an arrangement according to the present invention is advantageously possible in various configurations of the power supply terminals 12, 14 of the varistor 3. However, a varistor 3 of which at least one of the power supply terminals projects over one of its main extension surfaces, as in the case of the first terminal 12 in FIGS. 2 to 5 and FIG. 7, is preferably used, to be capable of using an extended effective surface without significantly increasing the bulk of the device 1.

Of course, the present invention is not limited to a configuration in which the connection element 10 has a concave form with respect to the fuse elements. In other words, it is possible to reverse the shapes shown in FIGS. 4 and 6, i.e., to produce a projecting first connection element 10 coming into contact with the first and second fuse elements themselves arranged in the cavity of a recessed second connection element 11.

Figure 7:
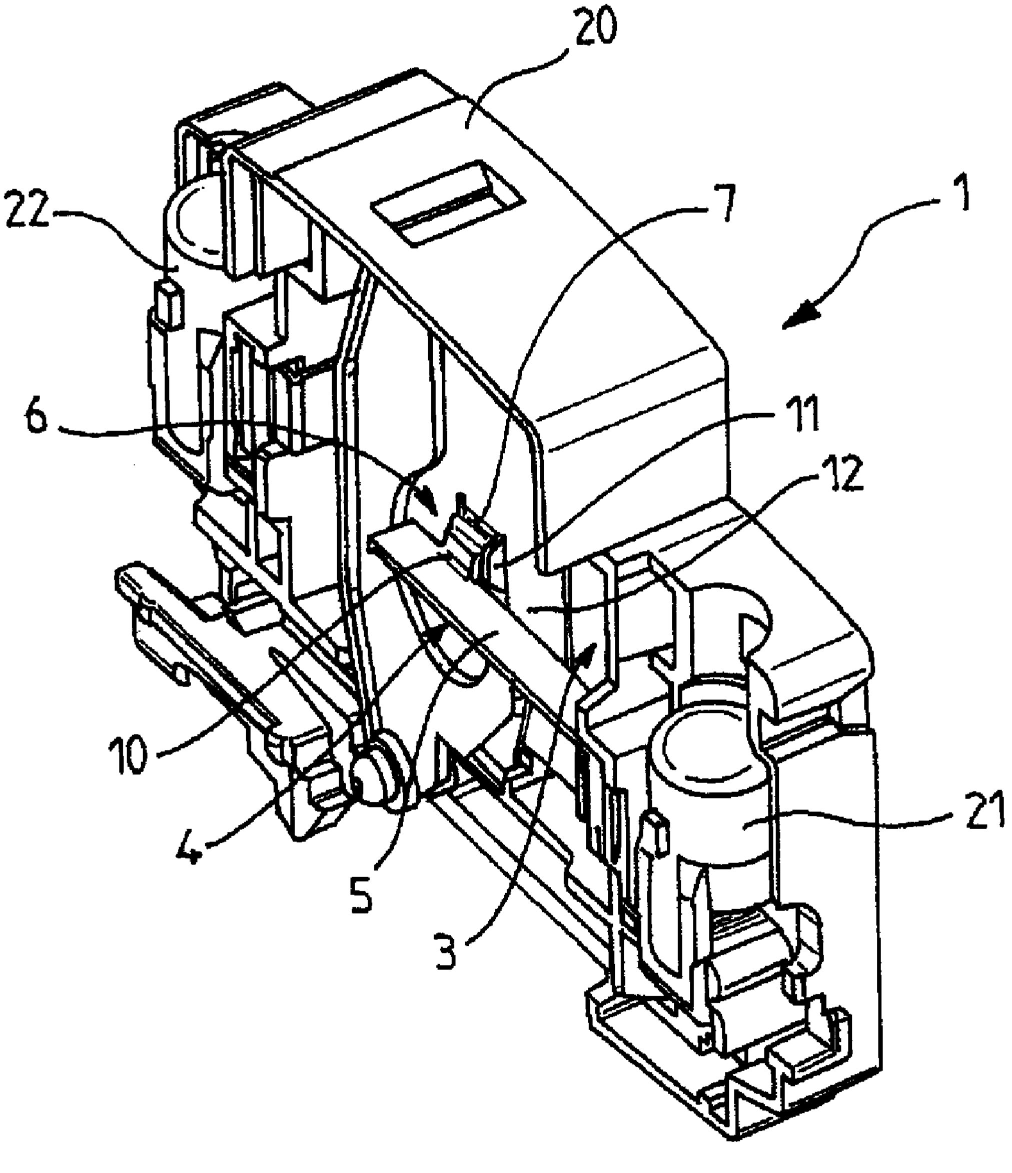
FIG. 7 is a perspective cross-section view of an alternative embodiment of a protection device according to the present invention.

According to an alternative exemplary embodiment shown in FIG. 7, the first power supply terminal 12 can, in particular, form a sort of chair, of which the seat would support the first fuse element 7, of which the backrest would support the second fuse element 8, and against which the disconnection leaf 5 would rest when it is in the closed position. In the alternative exemplary embodiment shown in FIG. 7, the first power supply terminal 12 is advantageously substantially at the centre of one of the main extension surfaces of the varistor 3, so that the disconnection leaf 5, when pivoting from the closed position to the open position, can have a large range of movement without increasing the bulk of the device 1, the range of movement being capable, in particular, of occurring in a space defined by the edges of the varistor 3.

While the first fuse element 7 and the second fuse element 8 can be separated, the first fuse element 7 and the second fuse element 8 are, according to a preferred exemplary embodiment, contiguous and form a one-piece assembly 7, 8 when the disconnection means 4 are in the closed configuration. In particular, the filler material joint can be substantially continuous and fill the entire gap between the first connection element 10 and the second connection element 11. Similarly, it is possible to consider embedding portions of the connection elements that extend beyond the effective surfaces in the filler material to form, for example, a large solder drop in which an arrangement according to the present invention is implemented.

In addition, the device 1 according to the present invention can advantageously comprise a standard-format insulating casing 20, in which, in particular, the protection component 3 is mounted. The device 1 also preferably includes two connection contacts 21, 22 making it possible to produce the electrical connection interface between the outside and the inside of the casing 20.

Finally, it is entirely possible to consider using either disconnection means 4 capable of moving in translation, such as a slider, or in rotation, without going beyond the context of the present invention. Similarly, it is possible to consider producing more complex blocking means 6, not consisting of a direct solder of the disconnection leaf 5, but including, for example, stop means, such as notches, capable of holding the disconnection means 4, the blocking means 6 being capable of moving away from the trajectory of the disconnection means 4 to allow the movement of the disconnection means 4 to the open position.

A method for producing an overvoltage protection device according to the present invention will now be described.

One exemplary method for producing a device 1 for protecting an electrical installation 2 from overvoltages, including at least one protection component 3 intended to be connected to the electrical installation, as well as disconnection means 4 capable of ensuring the electrical disconnection of the protection component from the installation, the disconnection means being capable of being moved from a closed configuration in which the protection component 3 is connected to the electrical installation to an open configuration in which the protection component 3 is disconnected from the electrical installation 2, preferably comprises a step (a) of producing the disconnection means 4 in which the disconnection means are given at least one first contact surface 4A and one second contact surface 4B substantially intersecting with one another.

The disconnection means are preferably produced in the form of a metal disconnection leaf 5. The leaf can advantageously be cut then bent, or stamped, to have different portions defining the first and second contact surfaces.

In particular, step (a) can comprise a sub-step (a') in which a first connection element 10 is produced, preferably by cutting and bending a metal leaf, which element has two branches on which the first and second contact surfaces 4A, 4B extend.

The production method also preferably comprises an assembly step (b) in which at least one first fuse element 7 and one second fuse element 8 are mounted in device 1 so that the first and second fuse elements can hold the disconnection means 4 in the closed configuration, and so that the first and second fuse elements respectively adhere to the first and second contact surfaces 4A, 4B when the disconnection means 4 are in the closed configuration. Step (b) preferably includes a phase ($b_1$) in which the casing 20 contains a protection component 3 of which one of the power supply terminals 12, 14 has a second connection element 11 with a shape substantially conjugated to the first connection element 10. As shown in FIGS. 2, 4, 6 and 7, the first power supply terminal 12 of the varistor 3 is preferably bent to form an L-shaped angle.

Figure 3:
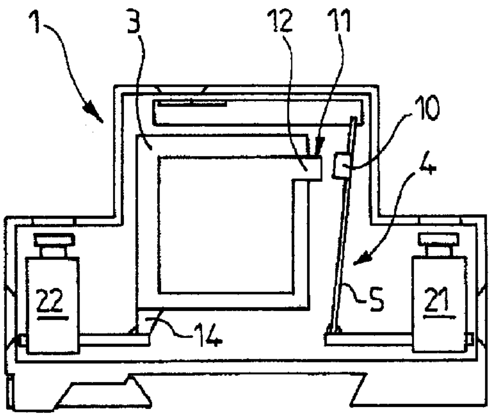
FIG. 3 is a front cross-section view of the protection device of FIG. 2 in its open configuration.

Step (b) preferably includes a phase ($b_2$) in which the disconnection leaf 5 is attached in the casing, so that the disconnection leaf 5 is electrically connected to one of the connection contacts 21, 22 of the device, for example, to the first connection contact 21 as shown in FIGS. 2 and 3.

According to a preferred exemplary embodiment, the placement of the fuse elements 7, 8 consists of producing a solder using a filler material with a low melting point in order to attach the free end of the disconnection leaf 5 to the corresponding terminal 12 of the varistor 3.

More specifically, step (b) preferably includes a phase ($b_3$) in which the first connection element 10 is brought closer to the second connection element 11 by bending the free end of the disconnection blade 5 until the connection elements overlap partially, defining a gap, then a phase ($b_4$) in which the gap is filled with a melting filler material.

The steps of the production method described above are not limiting and the numbering in no way limits the order of execution. For example, it is possible to consider coating one or the other of the connection elements 10, 11 with a filler material before performing phases $b_1$, $b_2$ and $b_3$, and causing a simple re-melting of the filler material when the leaf 5 is attached to the first power supply terminal 12.

The device according to the present invention advantageously makes it possible to reinforce the mechanical strength of the thermal disconnection means, by an over-sizing of the connection produced by the fuse elements, by multiplying the effective surfaces and extending their areas, making it possible to spread the filler metal over a larger overlap area and improve the adhesion of the attachments. In a particularly advantageous manner, this over-sizing does not significantly increase the overall bulk of the device, since it optimises the density of the effective surface within a given available volume.

Finally, the device according to the present invention advantageously makes it possible to moderate and/or distribute the stresses exerted on the fuse elements, so that it is possible to use non-polluting lead-free alloys to produce the fuse elements while substantially maintaining the discharge power of the device, i.e., the maximum intensity of the current that can be conducted repeatedly by the device without any deterioration.

The invention claimed is:

1. A device for protecting an electrical installation from overvoltages, comprising:

a) at least one protection component connected to the electrical installation, b) disconnection means for ensure the electrical disconnection of the protection component from the installation, wherein the disconnection means moves from a closed configuration when the protection component is connected to the electrical installation to an open configuration when the protection component is disconnected from the electrical installation, and c) at least one first fuse element and at least one second fuse element to hold the disconnection means in the closed configuration, and wherein the disconnection means comprises at least one first contact surface and at least one second contact surface substantially intersecting with one another and wherein the first and second fuse elements respectively adhere when the disconnection means are in the closed configuration, to distribute the stresses exerted on the fuse elements and reinforce the mechanical strength of the disconnection means.

2. The device of claim 1, wherein the first contact surface extends along a first mean extension plane and wherein the disconnection means are capable, when going from the closed configuration to the open configuration, of moving substantially parallel to the first mean extension plane.

3. The device of claim 1, wherein the second contact surface extends along a second mean extension plane, when the disconnection means are in the closed configuration, and wherein the disconnection means are capable, when going from the closed configuration to the open configuration, of moving substantially frontally away from the second mean extension plane.

4. The device of claim 1, wherein the first contact surface and/or the second contact surface is substantially planar.

5. The device of claim 2, wherein the first mean extension plane and the second mean extension plane form an angle between 70° and 110°, and are preferably substantially orthogonal.

6. The device of claim 1, wherein the disconnection means comprise a first connection element having two branches, the branches preferably being arranged in an L-shape, and wherein the first and second contact surfaces extend respectively on one and the other of the two branches.

7. The device of claim 6, comprising a second connection element that is stationary with respect to the protection component and wherein the device has a shape substantially conjugated to the first connection element and wherein, when the disconnection means are in the closed configuration, the first and second fuse elements are sandwiched between the first connection element and the second connection element.

8. The device of claim 1, wherein the first fuse element and the second fuse element are contiguous and form a one-piece assembly when the disconnection means are in the closed configuration.

9. The device of claim 1, wherein the first fuse element and/or the second fuse element includes a solder.

10. The device of claim 9, wherein the filler metal used to produce the solder contains less than 0.1% by weight lead.

11. The device of claim 1, wherein the protection component is formed by a varistor.

12. The device of claim 1, wherein the device is a lightning arrestor.

13. A method for producing a device for protecting an electrical installation from overvoltages, the device including at least one protection component intended to be connected to the electrical installation, as well as disconnection means for ensuring the electrical disconnection of the protection component from the installation, the disconnection means can be moved from a closed configuration in which the protection component is connected to the electrical installation to an open configuration in which the protection component is disconnected from the electrical installation, the method comprising steps of:

(a) producing the disconnection means wherein the disconnection means are given at least one first contact surface and one second contact surface substantially intersecting with one another, and (b) mounting at least one first fuse element and one second fuse element in the device so that the fuse elements can hold the disconnection means in the closed configuration, and so that the fuse elements respectively adhere to the first and second contact surfaces when the disconnection means are in the closed configuration, to distribute the stresses exerted on the fuse elements and reinforce the mechanical strength of the disconnection means.

14. The method of claim 13, wherein step (a) further comprises a sub-step (a') comprising bending a metal leaf to provide a first connection element wherein the element has two branches on which the first and second contact surfaces extend.

* * * * *